United States Patent [19]

Hostetler

[11] Patent Number: 5,184,570

[45] Date of Patent: Feb. 9, 1993

[54] COMPONENT WATERING SYSTEM

[75] Inventor: Eldon Hostetler, Middlebury, Ind.

[73] Assignee: Ziggity Systems, Inc, Middlebury, Ind.

[21] Appl. No.: 824,008

[22] Filed: Jan. 22, 1992

[51] Int. Cl.⁵ .............................................. A01K 7/00
[52] U.S. Cl. ..................................... 119/72; 119/72.5
[58] Field of Search ......................... 119/72, 72.5, 75; 248/68.1, 59, 62

[56] References Cited

U.S. PATENT DOCUMENTS

| | | | |
|---|---|---|---|
| 1,262,763 | 4/1918 | Farley | 248/62 |
| 2,972,460 | 2/1961 | Kenyon | 248/62 |
| 3,069,189 | 12/1962 | Hollaender . | |
| 3,418,977 | 12/1968 | Godshalk | 119/72.5 |
| 3,523,667 | 8/1970 | Guerrero | 248/68.1 |
| 3,526,934 | 9/1970 | Owen, Sr. | 248/68.1 X |
| 3,582,006 | 6/1971 | Thompson | 119/72.5 |
| 3,602,197 | 8/1971 | Fioretto | 119/72.5 |
| 3,856,246 | 12/1974 | Sinko | 248/68.1 |
| 4,516,533 | 5/1985 | Mallinson | 119/72 |
| 4,543,912 | 10/1985 | Steudler, Jr. | 119/18 |
| 4,601,447 | 7/1986 | McFarland | 248/68.1 X |
| 4,669,422 | 6/1987 | Steudler, Jr. | 119/72 |
| 4,724,797 | 2/1988 | Steudler, Jr. | 119/72 |
| 4,753,196 | 6/1988 | Lack et al. | 119/72 |
| 4,790,264 | 12/1988 | Lack et al. | 119/72.5 |
| 4,852,522 | 8/1989 | Uri | 119/72 |
| 4,884,528 | 12/1989 | Steudler, Jr. | 119/72.5 |
| 4,982,699 | 1/1991 | Momont | ./72.5 |

Primary Examiner—Gene Mancene
Assistant Examiner—Thomas Price
Attorney, Agent, or Firm—Barnes & Thornburg

[57] ABSTRACT

A poultry watering system is provided which is connected together by interlocking brackets, each overlaying one of the fluid conduit and support pipe, and a drinker saddle which interlocks with the bracket overlaying the fluid conduit. The support pipe bracket provides a connection element to join the watering system to a conventional suspension and elevation apparatus. The fluid conduit bracket can releasably interlock with the support pipe bracket to maintain the fluid conduit and support pipe in fixed relation, as in a floor system for raising poultry. Independent of the support pipe bracket, the fluid conduit bracket can releasably interlock with the drinker saddle to fix the fluid conduit within that bracket and simultaneously locate watering devices, such as nipple drinkers, at desired locations along the fluid conduit.

This arrangement is adaptable to support pipes and fluid conduits formed from a variety of materials and can accommodate slight dimensional variances in the support pipe and fluid conduit. With this invention, special preparation of the fluid conduit to retain the drinker saddles is not necesssary and drinker spacing can be readily estasblished as desired on-site. Thus, the poultry grower or watering system installer can advantageously utilize locally obtained support pipe and fluid conduit. Further, the brackets are configured and formed with sufficient flexibility so as to allow the watering system to be readily snap-fit together on-site. Thus, installation, maintenance and repair of such watering systems are simplified. Where poultry are raised in a cage systems, the support pipe and support pipe bracket are omitted and the fluid conduit brackets serve primarily to secure the saddles to the fluid conduit.

11 Claims, 7 Drawing Sheets

COMPONENT WATERING SYSTEM

BACKGROUND AND SUMMARY OF THE INVENTION

The present invention relates generally to watering systems for poultry and small animals. More particularly, this invention relates to bracket arrangements for assembly of poultry watering systems.

Present poultry watering systems are typically employed in two basic environments: floor systems and cage systems. In floor systems, poultry are raised in a large enclosure, a poultry house, for example, and are allowed freedom of movement over the floor of virtually the entire enclosure. To obtain efficient watering and avoid fluid spillage and injury to the birds caused by collisions with equipment, watering systems are typically suspended above the floor by wires running to the ceiling of the poultry house. Since these poultry houses are often hundreds of feet in length, the watering systems also typically include a plurality of generally parallel fluid conduits, each running hundreds of feet in length. The number of such parallel fluid conduits employed is generally determined by the width of the poultry house and the number of birds raised therein.

In cage systems, one or more birds are confined to a relatively small wire cage, often arranged vertically and horizontally in banks of many cages, within a poultry house. Since the poultry have freedom of movement only within the cage, feed and water must be supplied to each individual cage. Watering systems for cage systems are typically secured to the top of each cage. Since, for example, the cage tops provide some structure support, fewer components are usually needed for watering systems used with the cages. However, in order to minimize production costs, manufacturers of watering systems have tended to use the same basic watering structure for both floor systems and cage systems.

For example, a watering system for use in a floor system would often include a fluid conduit, a support pipe, brackets connecting the fluid conduit to the support pipe, hanger brackets to join the support pipe to suspension wires, and an anti-roosting wire spanning the hanger brackets. The fluid conduit often includes watering devices, such as nipple drinkers, either threaded directly into the fluid conduit or releasably attached thereto by saddles fixed to the fluid conduit by glue or ultrasonic welding. U.S. Pat. No. 4,669,422 and 4,753,196 are representative of prior patents showing such watering systems. In a cage system the same type of fluid conduit (with the same type of nipple drinkers thereon) would, for example, be secured by wire straps to the tops of the cages. However, the support pipe, connecting brackets, hanger brackets and anti-roosting wire would usually be unnecessary with cage systems.

Poultry watering systems are typically manufactured in partially assembled sections and shipped to poultry growers for final assembly and installation in the poultry houses. A substantial portion of the weight and size of watering systems packaged for shipment to poultry growers is attributable to the fluid conduit and, in the case of floor systems, also to the support pipe (usually made of standard, galvanized steel pipe). Shipment costs could be substantially reduced if the poultry grower was able to obtain suitable fluid conduit and/or support pipe in his locality. In many instances today poultry growers are able to obtain support pipe locally. However, most prior commercially acceptable watering systems required special preparation (such as gluing or welding) of the fluid conduit into order to retain the watering devices securely and without leaking. Most poultry growers and installers of watering systems do not have the equipment or expertise for such special preparation. Further, on-site mounting of the watering devices to the fluid conduit is often more time consuming and expensive than mounting at a watering system factory.

When selling watering systems to poultry growers in other countries not only are shipping costs more significant, but additional problems arise stemming from local import tariffs. For example, if the watering system is sold as a finished product requiring only final assembly, substantial import duties or taxes may be applied. If, on the other hand, the watering system is sold without the fluid conduit (and thereby avoids higher important duties), it can turn out that even if the installer could obtain fluid conduit formed from acceptable materials and otherwise properly prepare the fluid conduit to retain the watering devices, the size of the local fluid conduit which is available and/or preferred by custom in the industry of that country does not precisely fit with or connect to the other watering system components. As a result, such locally assembled watering systems may not function properly and/or have excess leakage. This can occur, for example, when selling watering system components between one country which uses a metric measuring system and another which does not.

Further, even when selling finished watering systems to other countries, local poultry equipment may require different spacing of watering system components (such as nipple drinkers) which are not standard formats in the domestic industry. The required customization can significantly increase production costs and reduce the viability of international sales. For example, this situation could occur where the cage banks is made in a country where manufacturers typically base spacing on metric units of measurement and the watering system is made in a country where manufacturers typically base drinker spacing on non metric units of measurement.

Accordingly, it is an object of the present invention to provide an improved poultry watering system. Other objects of the present invention, individually and collectively, include:

1. minimizing production and installation expenses of poultry watering systems,
2. providing component uniformity and interchangeability in watering systems supplied to different usage environments and applications,
3. minimizing the number of components needed in watering systems,
4. reducing shipping costs for watering systems,
5. reducing international tariff and duty costs for watering systems sold internationally,
6. facilitating international sales of watering systems,
7. providing a watering system capable of accommodating diverse spacing of nipple drinker components at reduced cost,
8. minimizing the difficulty of on-site assembly of watering systems and
9. providing a watering system which can readily accommodate fluid conduits and/or support pipes formed from various different materials.

These and other objects of the present invention are attained by the provision of a poultry watering system connected together by interlocking brackets, each overlaying one of the fluid conduit and support pipe, and a drinker saddle which interlocks with the bracket overlaying the fluid conduit. The support pipe bracket provides a connection element to join the watering system to a conventional suspension and elevation apparatus. The fluid conduit bracket can releasably interlock with the support pipe bracket to maintain the fluid conduit and support pipe in fixed relation, as in a floor system for raising poultry. Independent of the support pipe bracket, the fluid conduit bracket can releasably interlock with the drinker saddle to fix the fluid conduit within that bracket and simultaneously locate watering devices, such as nipple drinkers, at desired locations along the fluid conduit.

This arrangement is adaptable to support pipes and fluid conduits formed from a variety of materials and can accommodate slight dimensional variances in the support pipe and fluid conduit. With this invention, special preparation of the fluid conduit apart from placement of drinker openings to retain the drinker saddles is not necessary and drinker spacing can be readily established as desired on-site. Thus, the poultry grower or watering system installer can advantageously utilize locally obtained support pipe and fluid conduit. Further, the brackets are configured and formed with sufficient flexibility so as to allow the watering system to be readily snap-fit together on-site. Thus, installation, maintenance and repair of such watering systems are simplified. Where poultry are raised in a cage system, the support pipe and support pipe bracket are omitted and the fluid conduit brackets serve primarily to secure the saddles to the fluid conduit.

Other objects, advantages and novel features of the present invention will now be readily apparent to those skilled in the art upon consideration of the detailed drawings and description below.

DETAILED DESCRIPTION OF THE PREFERRED EMBODIMENT

Figure 1:
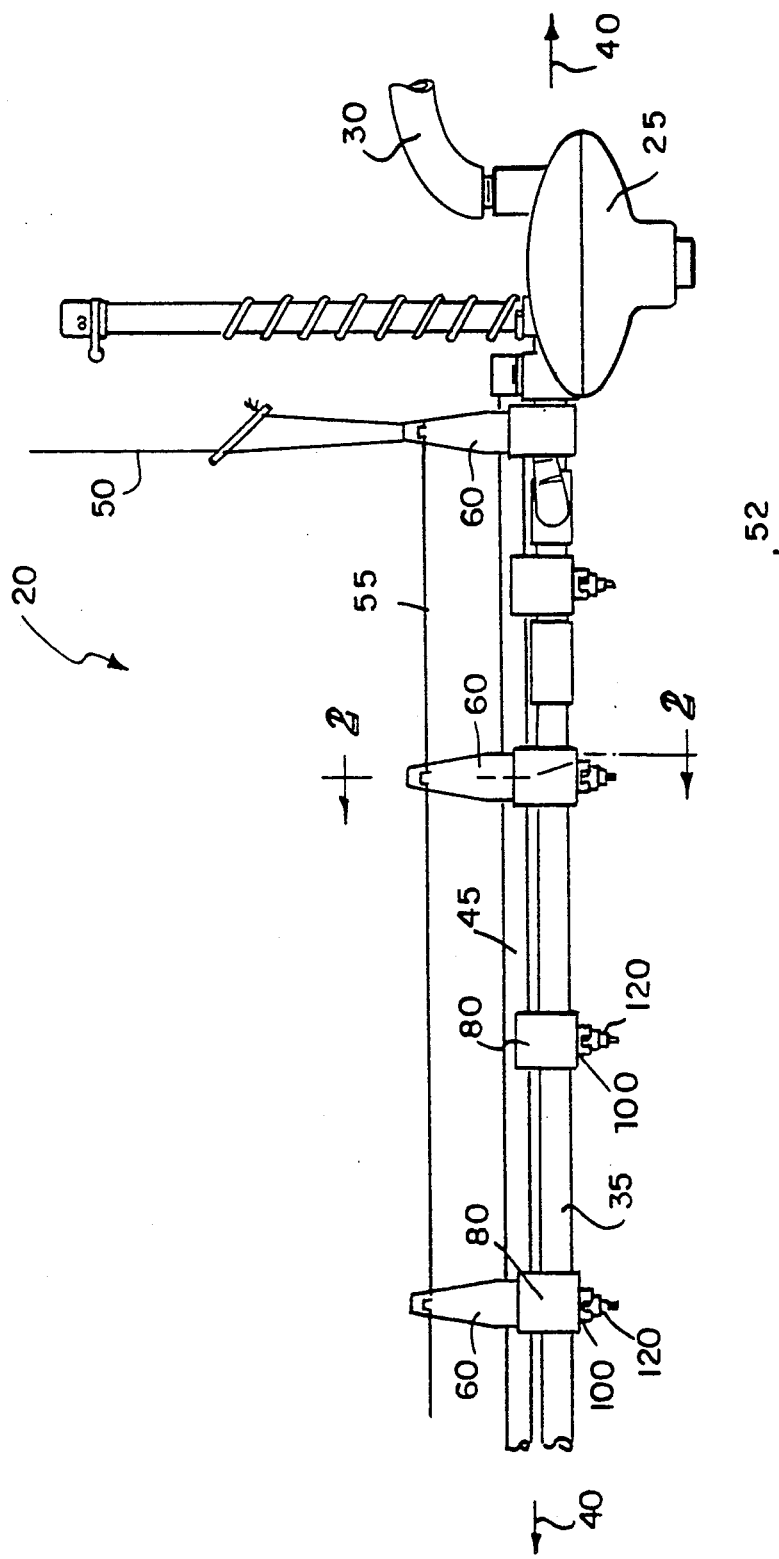
FIG. 1 shows a left side view of a portion of a poultry watering system including a preferred embodiment of the present invention.

In each of the figures herein like numbers denote like elements. FIG. 1, which illustrates a preferred embodiment of the present invention, shows a portion of watering system 20 which is installed in a poultry house using a floor system for raising poultry. Watering system 20 includes a fluid pressure regulator 25, a fluid supply line 30, a fluid conduit 35 extending generally along longitudinal axis 40, a support pipe 45, suspension wires 50 connected to a conventional apparatus for suspending and elevating the watering system above floor 52 of the poultry house, and an anti-roosting wire 55 extending above and spaced apart from support pipe 45 and fluid conduit 35. According to the present invention, watering system 20 also includes support pipe brackets 60, fluid conduit brackets 80, drinker saddles 100 and watering devices, such as nipple drinkers 120.

Typical poultry houses include enclosures which are several hundred feet in length. As is conventional, in such applications watering system 20 can also extend for several hundred feet and include several parallel segments, each of that length, depending in part upon the width of the poultry house. Thus, the view of FIG. 1 shows only a representative portion of the overall watering system sufficient to demonstrate application of the present invention to those skilled in the art. It will be understood that the present invention can readily be employed over all portions of the watering system.

Figure 2:
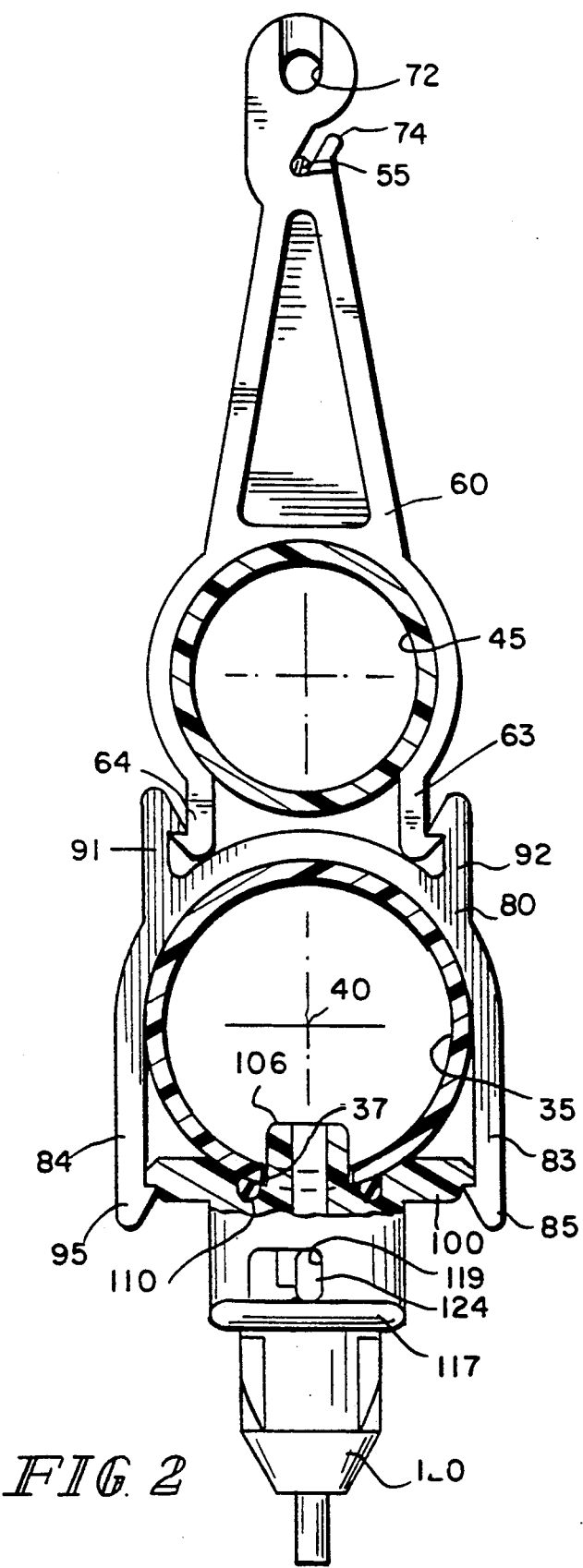
FIG. 2 is a cross-sectional view of the poultry watering system of FIG. 1 taken along line 2—2 of that figure.

As shown in FIG. 2, support pipe bracket 60 preferably encloses a portion of the exterior surface of support pipe 45 and attaches to an upper section of fluid conduit bracket 80. At its upper end, support pipe bracket 60 is attachable to suspension wire 50 and can support antiroosting wire 55. Fluid conduit bracket 80 preferably encloses a portion of the exterior surface of fluid conduit 35 and attaches to an upper section of drinker saddle 100. Fluid conduit 35 is provided with a plurality of openings 37 along its longitudinal length, and drinker saddles 100 penetrate those openings to provide fluid communication to nipple drinkers 120. Drinker saddles 100 releasably retain nipple drinkers 120 in fixed relation to fluid conduit 35.

As shown in FIG. 1, when using a conventional apparatus for suspending and elevating watering system 20 of the present invention it is not necessary to connect suspension wires 50 to each support pipe bracket 60. Similarly, support pipe 45 can usually be held in sufficiently fixed relation with respect to fluid conduit 35 by connecting some, but not all of fluid conduit brackets 80 to support pipe brackets 60, depending upon the weight and strength of the support pipe and fluid conduit selected. However, it has been found to be particularly advantageous to connect every drinker saddle 100 to a fluid conduit bracket 80 to avoid the special preparations of the fluid conduit needed in prior watering systems to retain the watering devices. Thus, in typical floor system applications fewer support pipe brackets will be used than fluid conduit brackets, and not all of the functional capabilities of either bracket will always be used by each bracket.

Figure 5:
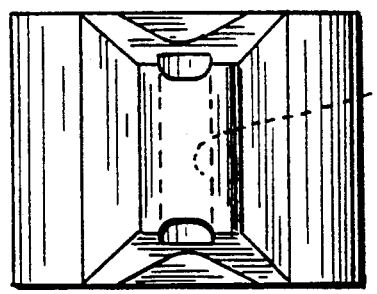
FIG. 5 is a top view of the support pipe bracket of FIG. 3.
Figure 3:
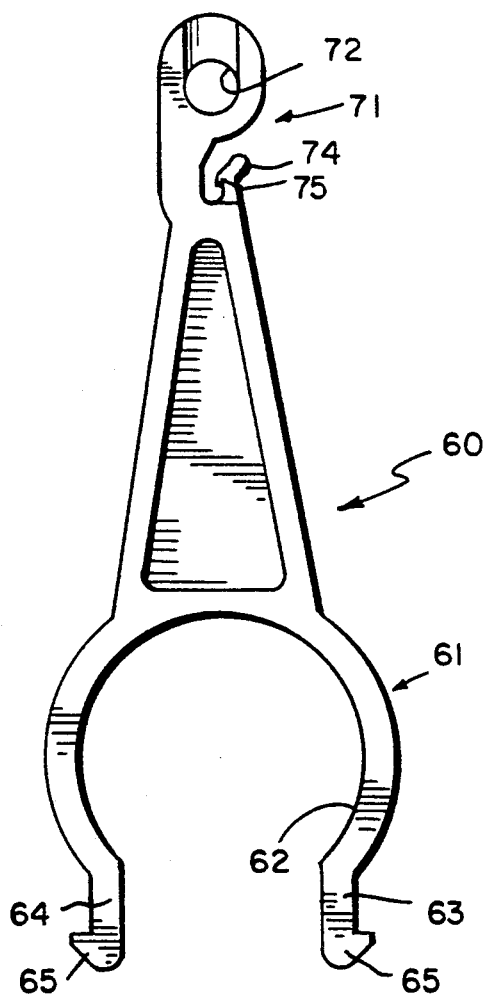
FIG. 3 is a cross-sectional view of the support pipe bracket portion of the poultry watering system of FIG. 1 taken along line 2—2 of that figure.
Figure 4:
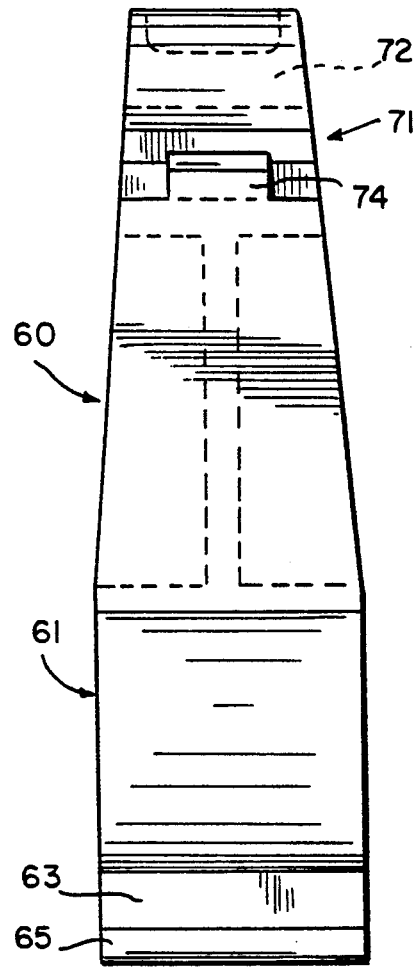
FIG. 4 is left side view of the support pipe bracket of FIG. 3.

FIGS. 3-5 show the support pipe bracket in particular. Support pipe bracket 60 preferably includes a generally U-shaped lower portion 61 having an interior surface 62 which generally conforms to the exterior configuration of the cross-section of the portion of support pipe 45 to be engaged. Where support pipe 45 is a cylindrical pipe it has been found to be especially advantageous to form interior surface 62 to engage more than half of the circumference of support pipe 45 in a close fit. Portion 61 is constructed, for example, so as to be sufficiently flexible to permit support pipe 45 to be snap-fit into engagement with interior surface 62. At the same time, portion 61 would resist disengagement of support pipe 45 from interior surface 62 except by forces intentionally applied for that purpose. P.V.C. plastic material has been found to be especially suitable for formation of support pipe bracket 60.

Lower portion 61 also includes downwardly extending arms 63 and 64, preferably at the open ends of interior surface 62. Arms 63 and 64 each include a locking hook 65 at the lower ends thereof. Support pipe bracket 60 also includes an upper portion 71 having a passageway 72 therethrough for freely receiving suspension wires 50. Upper portion 71 also includes a flexible flange 74 for receiving anti-roosting wire 55 therein via a snap-fit connection. Interior ledge 75 of flange 74 resists removal of anti-roosting wire 55 once fully inserted into support pipe bracket 60. In those applications where anti-roosting wire 55 is to be electrified and support pipe 45 is to serve as a circuit ground, as in previous watering systems, support pipe bracket 60 is preferably formed from material which is not electrically conductive.

It should be noted that although galvanized, electrically conductive steel pipe is typically used to support the fluid conduit and provide ballast weight in conventional watering systems, other supportive elements have also been employed, such as aluminum channel, in some watering systems. The configuration of bracket 60 can readily be adapted for use with those other supportive elements, according to the external cross-section configurations of those supportive elements. Similarly, where the fluid conduit is sufficiently rigid without use of a support pipe, bracket 60 can serve as a hanger bracket and anti-roosting bracket by connection to fluid conduit bracket 80 without engagement to a support pipe.

Figure 8:
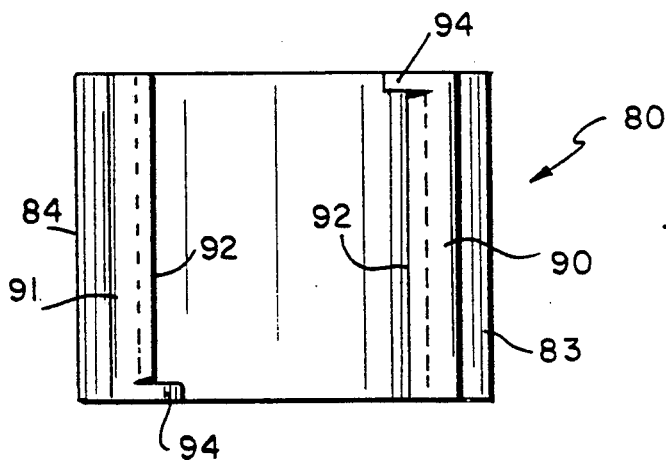
FIG. 8 is a top view of the fluid conduit bracket of FIG. 6.
Figure 6:
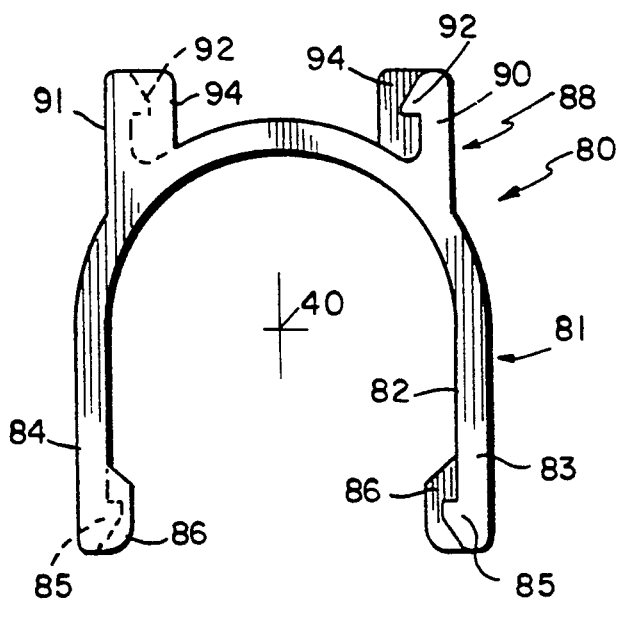
FIG. 6 is a cross-sectional view of the fluid conduit bracket portion of the poultry watering system of FIG. 1 taken along line 2—2 of that figure.
Figure 7:
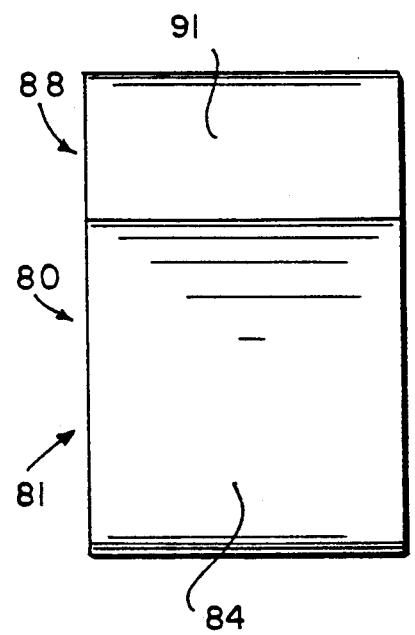
FIG. 7 is a left side view of the fluid conduit bracket of FIG. 6.
Figure 11:
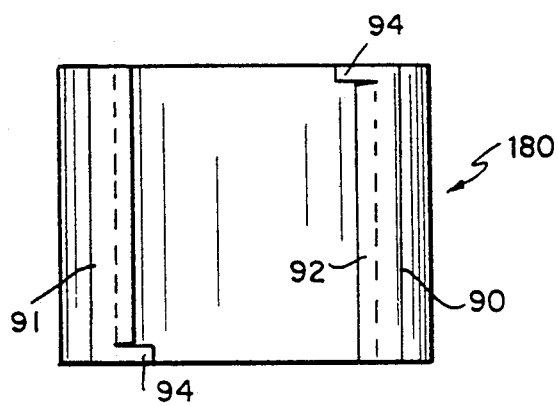
FIG. 11 is a top view of the fluid conduit bracket of FIG. 9

FIGS. 6-8 show in particular fluid conduit bracket 80. This bracket includes, for example, a lower portion 81 having a generally U-shaped interior surface 82 which preferably conforms in a general way to the portion of the exterior surface of the cross-sectional configuration of fluid conduit 35 which is to be engaged by bracket 80. Lower portion 81 also includes a pair of downwardly extending arms 83 and 84, preferably formed at the open ends of interior surface 82. Arms 83 and 84 each include a locking hook 85 at the lower ends thereof. On alternate sides of the lower ends of arms 83 and 84, stop elements 86 are formed.

Figure 9:
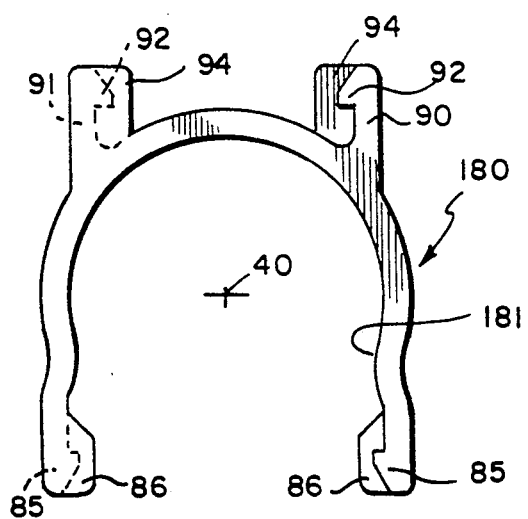
FIG. 9 is a cross-sectional view corresponding to FIG. 6 of an alternate embodiment of a fluid conduit bracket according to the present invention.
Figure 10:
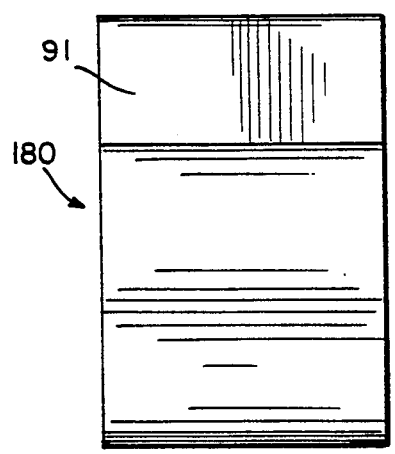
FIG. 10 is a left side view of the fluid conduit bracket of FIG. 9.
Figure 14:
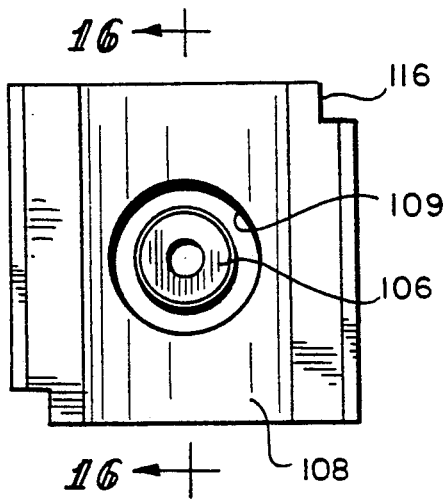
FIG. 14 is a top view of the drinker saddle of FIG. 12.
Figure 16:
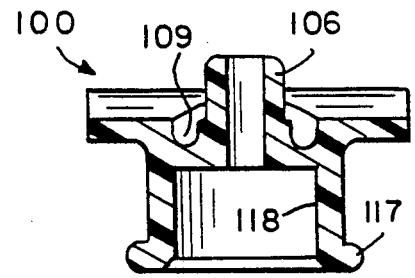
FIG. 16 is a cross-sectional view of the drinker saddle of FIG. 12 taken along line 16—16 of FIG. 14 and excepting the slots for receiving a nipple drinker.
Figure 13:
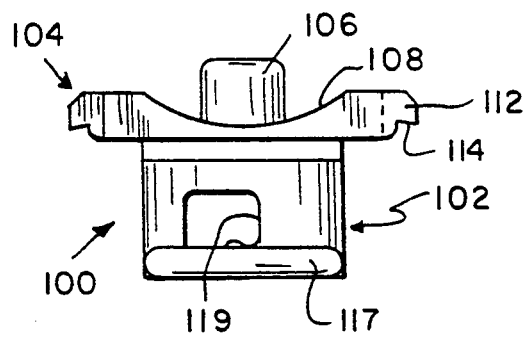
FIG. 13 is an end view of the drinker saddle of FIG. 12.
Figure 12:
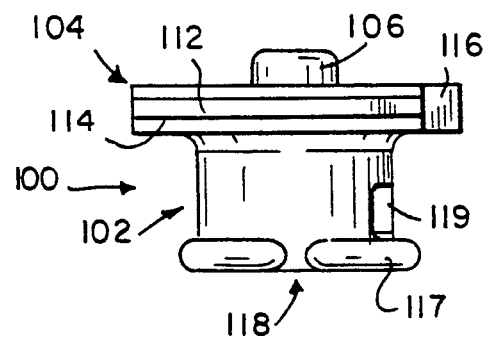
FIG. 12 is a left side view of a drinker saddle portion of the poultry watering system of FIG. 1.
Figure 15:
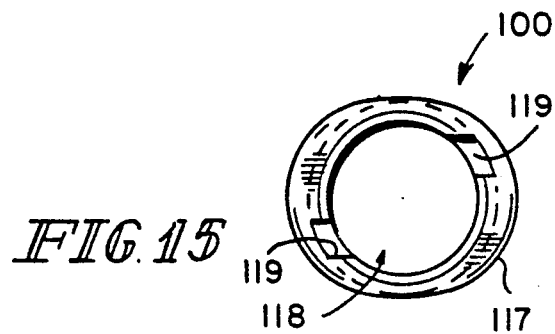
FIG. 15 is a bottom end view of the drinker saddle of FIG. 12.

Because drinker saddle 100 also engages fluid conduit 35 and, together with bracket 80, encloses fluid conduit 35 within interior surface 82, some embodiments of the present invention do not require interior surface 82 to closely conform and engage to the exterior surface of fluid conduit 35. However, it has been found to be especially advantageous where watering system 20 is assembled on-site to employ the alternative embodiment of bracket 80 shown in FIGS. 9-10 as bracket 180. This bracket 180 includes and interior surface 181 which conforms to fluid conduit 35 in substantially the same manner as interior surface 61 conforms to support pipe 45. Further, bracket 180 is likewise formed with flexibility and, thus, fluid conduit 35 can be similarly snap-fit into bracket 180 and retained against inadvertent removal. In other respects bracket 180 preferably includes the same features as bracket 80.

Bracket 80 further includes upper portion 88 having a pair of arms 90 and 91 extending generally upwardly from bracket 80. Arms 90 and 91 each include a locking hook 92 at the upper ends thereof. Locking hooks 92 are complimentarily formed with respect to locking hooks 65 and arms 90 and 91 are disposed with respect to arms 63 and 64 such that bracket 80 releasably engages bracket 60 and retains support pipe 45 in fixed relation to fluid pipe 35 during normal usage of watering system 20. Arms 63, 64, 90 and 91 are formed with respect to each other so as to have sufficient flexibility to permit snap-fit interconnection during on-site assembly of watering system 20. For example, bracket 80 can also be formed in its entirety from PVC plastics. Further, bracket 80 includes on alternate sides of the upper ends of arms 90 and 91, stop elements 94 to prevent relative sliding of arms 63, 64, 90, and 91 to cause inadvertent disengagement of brackets 60 and 80.

FIGS. 12-16 show in particular drinker saddle 100. As with brackets 60 and 80, drinker saddle 100 is preferably formed so as to be releasably engageable with bracket 80 via a snap-fit connection. Drinker saddle 100 can be formed at its lower end 102 with any conventional means of releasably retaining any desired watering device, such as cup drinkers or nipple drinkers. In especially preferred embodiments, however, drinker saddle 100 is formed so as to receive and releasably retain a nipple drinker 120 of the type currently marketed by Ziggity Systems, Inc. of Middlebury, Ind. under the name "Big Ace" or "1300" style drinker. Such nipple drinkers are also shown in co-pending U.S. patent application Ser. No. 07/648,400. The disclosure of that patent application is specifically incorporated herein by reference.

As applied to the present invention, drinker saddle 100 includes an upper portion 104 for forming a secure, fluid tight seal against fluid conduit 35 and retaining fluid conduit 35 within bracket 80. Upper portion 104 includes a projecting conduit 106 which is of sufficient length to extend upward through openings 37 and into fluid conduit 35. Thus, projecting conduit 106 permits fluid to flow from fluid conduit 35 into the interior of drinker saddle 100.

Upper portion 104 also includes mating surface 108 which, for example, generally conforms to the lower exterior surface of fluid conduit 35. Mating surface 108 includes recess 109 therein about projecting conduit 106 for receiving a sealing O-ring 110. This O-ring is preferably sufficiently large and compressible accommodate some dimensional variance between the cavity created by the closure of interior surface 82 and drinker saddle 100 and the configuration of fluid conduit 35 without permitting leakage from opening 37.

Drinker saddle 100 also includes latching flanges 112 extending outward from upper portion 104. These flanges are preferably configured and dimensioned to be closely received between arms 83 and 84 and releasably retained by locking hooks 85. Mating ledges 114 are, for example, formed on each flange end with a complimentary configuration to locking hooks 85 so as to resist unintentional removal of drinker saddle 100 once snap-fit into bracket 80. Flanges 112 preferably include cut out sections 116 at opposite ends to receive stop elements 86 in a close fit. Stop elements 86 prevent inadvertent sliding disengagement of saddle drinker 100 from bracket 80 in substantially the same manner as stop elements 94 function with respect to brackets 60 and 80. However, if penetration of projecting conduit 106 into opening 37 is of sufficient length and a close fit within opening 37, projecting conduit 106 can alternatively serve to prevent that sliding disengagement.

Figure 18:
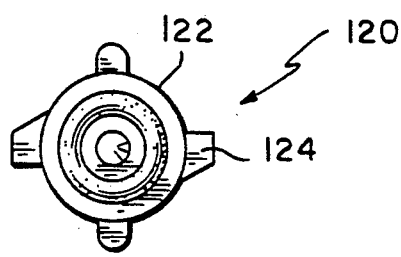
FIG. 18 is a top view of the nipple drinker of FIG. 17.
Figure 17:
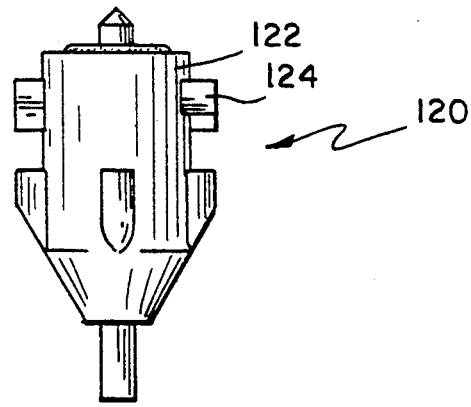
FIG. 17 is a left side view of a nipple drinker of the watering system of FIG. 1.

FIGS. 17 and 18 show in particular nipple drinker 120. This drinker includes an upper portion 122 and locking projections 124. Lower portion 102 of drinker saddle 100 includes lower recess 118 to receive upper portion 122 of nipple drinker 120. Lower portion 102 also includes slots 119 to receive locking projections 124. Lower portion 102 also includes reinforcing ring 117 about recess 118. Preferably, drinker saddle 100 is formed from polypropylene plastic materials, and nipple drinker 120 is preferably formed from A.B.S. plastic materials.

Although the present invention is illustrated above in connection with a floor system for raising poultry, it will be readily understood that the arrangement of bracket 80, drinker saddle 100 and nipple drinker 120 will also be advantageous in cage systems. For example, during on-site installation openings 37 can be placed at any desired location along the fluid conduit and drinker saddles 100 thereafter would be merely snap-fit in place without the need for welding or gluing. Thus, any desired fluid conduit material can be employed.

Although the present invention has been described above in detail, the same is by way of illustration and example only. Those skilled in the art will now recognize that various modications can be made to produce other embodiments of the present invention. Accordingly, the spirit and scope of this invention are limited only by the terms of the following claims.

What is claimed is:

1. A watering system for poultry and small animals comprising:
   at least one fluid conduit,
   at least one longitudinally extending support element, and
   bracket means for releasably locating said fluid conduit and said support element in spaced apart, parallel relation,
   said bracket means including first and second bracket elements,
   said first bracket element being formed so as to surround at least a portion of the exterior surface of said support element,
   said second bracket element being formed so as to surround at least a portion of the exterior surface of said fluid conduit,
   said first bracket element including a first connecting member,
   said second bracket element including a second connector member, and
   said first and second connecting members being formed with respect to each other such that interengagement of said first and second connecting members permits releasable engagement of said first and second bracket elements via a snap-fit connection to fixedly locate said fluid conduit and said support element relative to each other.

2. The watering system according to claim 1 wherein said watering system is suspended above the floor of a poultry enclosure and wherein said first bracket element also includes means for connecting said support element to an apparatus for so suspending said watering system.

3. The watering system according to claim 2 wherein said watering system also includes apparatus for preventing poultry from roosting on said watering system and said first bracket element includes means for releasably engaging said apparatus and fixedly locating said apparatus with respect to said support element.

4. The watering system according to claim 3 wherein said watering system further comprises:
   at least one watering device, and
   a saddle element for each of said watering devices,
   said saddle element being formed so as to releasably retain said watering device and including means for establishing fluid communication between said fluid conduit and said watering device, and
   said second bracket element including at least one projecting flange extending generally outward from said fluid conduit to releasably engage said saddle element and fixedly locate said fluid conduit and said saddle element relative to each other.

5. A poultry watering system, for suspension above the floor of a poultry enclosure, comprising:
   a fluid conduit,
   a support pipe disposed in spaced apart, parallel relation to said fluid conduit,
   a first bracket having an interior surface formed to surround more than half of the cross-sectional configuration of a portion of said support pipe,
   said first bracket also including a first pair of connection arms extending toward said fluid conduit,
   a second bracket having an interior surface formed to surround at least a portion of the cross-sectional configuration of a portion of said fluid conduit,
   said second bracket including a second pair of connection arms extending toward said support pipe and releasably engaging said first pair of connection arms to retain said first and second brackets together,
   said second bracket also including a third pair of connection arms extending generally outward from said fluid conduit,
   a watering device for providing fluid to poultry,
   a saddle element for releasably retaining said watering device,
   said saddle element and said fluid conduit including means for establishing fluid communication between said fluid conduit and said watering device, and
   flange means located on said saddle element for releasably engaging said third pair of connection arms and retaining said fluid conduit in fixed relation with respect to said second bracket.

6. An assembly arrangement for poultry watering systems having a longitudinally extending fluid conduit, a support pipe extending parallel to and above said fluid conduit, and a plurality of watering devices for actuation by poultry to provide fluid thereto, comprising:

a first bracket having a generally U shaped cross-section for receiving therein said support pipe, said first bracket also having a first pair of arms, downwardly extending and including connection hooks at the termination of those arms, a second bracket having a generally U-shaped cross-section for receiving therein said fluid conduit, said second bracket also having a second pair of arms, downwardly extending and including connection hooks at the termination of those arms, said second bracket also having a third pair of arms, upwardly extending and including connection hooks at the termination of those arms which are releasably engageable with the connection hooks of said first pair of arms to connect said first bracket to said second bracket, a saddle means for releasably retaining each of said watering devices in fluid communication with said fluid conduit, and said saddle means including flanges which are releasably engageable with the connection hooks of said second pair of arms to retain said fluid conduit within said second bracket.

7. The assembly arrangement according to claim 6 wherein the number of said second brackets employed in said poultry watering system is at least as great as the number of said saddle means employed in said poultry watering system and the number of said first brackets employed in said poultry watering system is less than the number of said second brackets so employed.

8. The assembly arrangement according to claim 6 wherein said fluid conduit includes a plurality of openings along its longitudinal length and said saddle means are disposed so as to penetrate each of said openings.

9. The assembly arrangement according to claim 6 wherein said watering system is employed in an enclosure for poultry and includes an apparatus for suspending said watering system above the floor of said enclosure, and said assembly arrangement further includes connection means on said first bracket for attaching said first bracket to said apparatus for suspending said watering system.

10. A watering system for poultry and small animals comprising:

at least one fluid conduit, at least one longitudinally extending support element, and bracket means for releasably locating said fluid conduit and said support element in spaced apart, parallel relation, said bracket means including first and second bracket elements, said first bracket element being formed so as to surround at least a portion of the exterior surface of said support element, said second bracket element being formed so as to surround at least a portion of the exterior surface of said fluid conduit, said first bracket element including at least one projecting flange extending generally outward from said support element, said second bracket element including at least one projecting flange extending generally outward from said fluid conduit, said projecting flanges each including thereon complimentary connection means for releasably engaging the other projecting flange to fixedly locate said fluid conduit and said support element relative to each other, said watering system being suspended above the floor of a poultry enclosure and said first bracket element also including means for connecting said support element to an apparatus for so suspending said watering system, said watering system also including apparatus for preventing poultry from roosting on said watering system and said first bracket element including means for releasably engaging said apparatus and fixedly locating said apparatus with respect to said support element, said watering system further comprising at least one watering device and a saddle element for each of said watering devices, said saddle element being formed so as to releasably retain said watering device and including means for establishing fluid communication between said fluid conduit and said watering device, and said second bracket element including at least one projecting flange extending generally outward from said fluid conduit to releasably engage said saddle element and fixedly locate said fluid conduit and said saddle element relative to each other.

11. A poultry watering system, for suspension above the floor of a poultry enclosure, comprising:

a fluid conduit, a support pipe disposed in spaced apart, generally parallel relation to said fluid conduit, a first bracket having an interior surface formed so as to surround at least a portion of the exterior surface of said support element, said first bracket also including a pair of connection arms extending toward said fluid conduit, a second bracket being formed so as to surround at least a portion of the exterior surface of said fluid conduit, and said second bracket including a second pair of connection arms extending toward said support pipe and releasably engaging said first pair of connection arms to retain said first and second brackets together.

* * * * *